(12) United States Patent
Kodama et al.

(10) Patent No.: US 8,202,571 B2
(45) Date of Patent: Jun. 19, 2012

(54) MANUFACTURING METHOD FOR MAGNETIC RECORDING MEDIUM

(75) Inventors: Hiroyoshi Kodama, Kawasaki (JP);
Wataru Yamagishi, Kawasaki (JP);
Takuya Uzumaki, Kawasaki (JP);
Atsushi Tanaka, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 230 days.

(21) Appl. No.: 12/706,448

(22) Filed: Feb. 16, 2010

(65) Prior Publication Data

US 2010/0140214 A1  Jun. 10, 2010

Related U.S. Application Data

(62) Division of application No. 11/441,087, filed on May 26, 2006, now abandoned.

(30) Foreign Application Priority Data

Feb. 16, 2006  (JP) ................................. 2006-039197

(51) Int. Cl.
*G11B 5/855* (2006.01)
(52) U.S. Cl. ........................................ 427/129; 427/127
(58) Field of Classification Search ................... 427/127, 427/128, 129, 130, 131, 132
See application file for complete search history.

(56) References Cited

U.S. PATENT DOCUMENTS

| | | | | |
|---|---|---|---|---|
| 5,411,630 A | * | 5/1995 | Nagase et al. | 216/22 |
| 6,352,758 B1 | * | 3/2002 | Huang et al. | 428/143 |
| 6,602,620 B1 | * | 8/2003 | Kikitsu et al. | 428/842.2 |
| 6,884,328 B2 | | 4/2005 | Litvinov et al. | |
| 7,153,597 B2 | | 12/2006 | Yang et al. | |
| 7,220,482 B2 | | 5/2007 | Mino et al. | |
| 7,488,429 B2 | | 2/2009 | Okawa et al. | |
| 2004/0071924 A1 | * | 4/2004 | Yang et al. | 428/65.3 |
| 2005/0013971 A1 | | 1/2005 | Nam | |
| 2005/0266271 A1 | | 12/2005 | Tsuchiya et al. | |
| 2005/0284842 A1 | | 12/2005 | Okawa et al. | |
| 2006/0105205 A1 | | 5/2006 | van de Veerdonk et al. | |
| 2006/0153976 A1 | | 7/2006 | Ito et al. | |
| 2006/0286699 A1 | * | 12/2006 | Chae et al. | 438/30 |
| 2009/0071935 A1 | | 3/2009 | Nam | |
| 2010/0248111 A1 | * | 9/2010 | Kobayashi et al. | 430/105 |

FOREIGN PATENT DOCUMENTS

| | | |
|---|---|---|
| JP | 4-310621 A | 11/1992 |
| JP | 2000-54012 A | 2/2000 |
| JP | 2001-167431 A | 6/2001 |

(Continued)

OTHER PUBLICATIONS

Japanese Office Action dated May 18, 2010, issued in corresponding Japanese Patent Application No. 2006-039197.

(Continued)

*Primary Examiner* — Michael Cleveland
*Assistant Examiner* — Tabassom Tadayyon Eslami
(74) *Attorney, Agent, or Firm* — Westerman, Hattori, Daniels & Adrian, LLP (57) ABSTRACT

The method for manufacturing a magnetic recording medium in a shape of a disk includes forming convex sections repeating on the upper surface of an intermediate layer in the radial direction of the disk, and each having an upper surface that repulses magnetic particles; and filling the magnetic particles into concave sections sandwiched by the convex sections in a self-assembling way to form a magnetic recording layer with the magnetic particles.

14 Claims, 7 Drawing Sheets

FOREIGN PATENT DOCUMENTS

| | | |
|---|---|---|
| JP | 2003-155365 A | 5/2003 |
| JP | 2004-110917 A | 4/2004 |
| JP | 2005-44496 A | 2/2005 |
| JP | 2005-235301 A | 9/2005 |
| JP | 2006-12332 A | 1/2006 |

OTHER PUBLICATIONS

Japanese Office Action dated Feb. 23, 2010, issued in corresponding Japanese Patent Application No. 2006-039197.

Shouheng Sun et al., "Synthesis of monodisperse cobalt nanocrystals and their assembly into magnetic superlattices (invited)", Journal of Applied Physics, 1999, vol. 85, pp. 4325-4330.

Shouheng Sun et al., "Monodisperse FePt Nanoparticles and Ferromagnetic FePt Nanocrystal Superlattices", Science, 2000, vol. 287, pp. 1989-1992.

T. Homma, "Fabrication of Nanostructured Functional Thin Films through Wet Processes", Japanese Applied Magnetics Society Magazine, 2005, vol. 29, No. 12, pp. 1035-1040.

* cited by examiner

STEP 1

STEP 2

MANUFACTURING METHOD FOR MAGNETIC RECORDING MEDIUM

CROSS-REFERENCE TO RELATED APPLICATIONS

This application is a division of U.S. application Ser. No. 11/441,087, filed on May 26, 2006 now abandoned which is based upon and claims the benefit of priority from the prior Japanese Patent Application No. 2006-39197, filed on Feb. 16, 2006, the entire contents of which are incorporated herein by reference.

BACKGROUND OF THE INVENTION

1. Field of the Invention

The present invention relates to a magnetic recording medium used for an information recording/reproducing device, such as a hard disk device.

2. Description of the Related Art

In recent years, moves towards the downsizing and increasing in capacity of magnetic recording/reproducing devices are rapidly progressing. In order to increase the magnetic recording density of the magnetic recording medium used for a magnetic recording/reproducing device, it is essential to decrease the noises of the magnetic recording medium, and for this purpose, it is necessary to decrease and make uniform the particle size of a hard magnetic substance used for the magnetic recording layer. In addition, in the case of a disk-shaped magnetic recording medium, the magnetic recording density is determined by the magnetic recording track density in the radial direction and the density in the circumferential direction which is called the "line recording density". Accordingly, in order to improve the magnetic recording density of the magnetic recording medium, it is also important to increase the magnetic recording track density in the radial direction. As a method for increasing the magnetic recording track density in the radial direction, a magnetic recording medium called "discrete track medium" has been proposed and researched/developed. This is a magnetic recording medium having a structure to make magnetic recording tracks narrower by separating adjacent magnetic recording tracks {see Japanese Unexamined Patent Application Publication No. H4-310621 (Claims)}.

As a means for separating the magnetic recording tracks of a magnetic recording layer as described above, a structure for separating the magnetic recording layer structurally by a non-magnetic material, and a structure for separating the magnetic recording tracks magnetically by separating the soft magnetic material of the backing layer (or soft magnetic layer), are proposed. In the latter case, the soft magnetic layer is structurally separated, so the magnetic recording layer has a structure which forms a continuous layer without separation.

A feature in common in both means is that protrusions/recesses for the purpose of separation are created on the non-magnetic material or on the surface of the substrate under the backing layer. Therefore a final step of flattening the magnetic recording layer surface is always required so that the magnetic head smoothly flies and moves over the layer.

In a type wherein the magnetic recording layer is separated by a non-magnetic material, for example, protrusions/recesses are created by a resist pattern or the like after an intermediate layer is formed, for example, then steps of stripping the resist, forming a non-magnetic material film, forming a magnetic recording layer film by a sputtering method or the like, polishing for surface smoothing, etc. are required.

In the structure wherein the backing layer is separated, on the other hand, protrusions/recesses are created on the substrate by a resist pattern, for example, then steps of forming a backing layer film, stripping the resist, forming a non-magnetic material film, surface smoothing, polishing and forming a magnetic recording layer film by a sputtering method or the like are required.

In other words, in both cases a polishing step or other steps are required. Details on the fabrication methods may be different from the example shown here, but such a situation is the same for the two methods.

The flying height of a magnetic head, however, is about 10 nm, and it is very difficult to accomplish the surface smoothness of the magnetic recording layer (surface of the sputtered film) required for this flying height. Even if it is accomplished, a very large number of processing steps and manufacturing facilities are required, resulting in a serious problem in terms of cost.

It is an object of the present invention to solve the above-described problems, and provide a new discrete track medium which has a high magnetic recording density, and a manufacturing method therefor. Other objects and advantages of the present invention shall be clarified by the following description.

SUMMARY OF THE INVENTION

According to an aspect of the present invention, a disk-shaped magnetic recording medium, having a soft magnetic layer, a magnetic recording layer over the soft magnetic layer, and an intermediate layer directly under the magnetic recording layer, wherein the magnetic recording layer has a plurality of magnetic recording tracks arranged in the radial direction of the magnetic recording medium, and each magnetic recording track is separated from the other in the radial direction of the disk by concave sections and convex sections formed alternately on the upper surface of the intermediate layer in the radial direction of the disk, is provided.

By this aspect of the present invention, a new discrete track medium having a high magnetic recording density is implemented.

Preferable are that the magnetic recording medium further has parts where the magnetic recording tracks are separated also in the circumferential direction of the disk by the concave sections and convex sections formed on the upper surface of the intermediate layer in the circumferential direction of the disk; that the convex sections are made of carbon; that the average particle size of magnetic particles used for the magnetic recording layer is in a 2-15 nm range; that the surfaces of the magnetic particles are surface-treated so that the minute particles attract each other in a self-assembling way; that the magnetic particles are FePt nano-particles; and that the intermediate layer is composed of one or more layers of a non-magnetic material.

According to another aspect of the present invention, a method for manufacturing a magnetic recording medium in a shape of a disk, which comprises a soft magnetic layer, a magnetic recording layer over the soft magnetic layer, and an intermediate layer directly under the magnetic recording layer, comprising forming concave sections and convex sections alternately on the upper surface of the intermediate layer in the radial direction of the disk, and filling magnetic particles into the concave sections in a self-assembling way, is provided.

By this aspect of the present invention, a new discrete track medium having a high magnetic recording density can be produced. It is also possible to omit or decrease the burden of the polishing step.

Preferable are that the manufacturing method further comprises forming concave sections and convex sections on the upper surface of the intermediate layer in the circumferential direction of the disk; that the method comprises treating the upper surfaces of the convex sections to be hydrophilic or hydrophobic so as to repel magnetic particles; that the method comprises treating the upper surfaces of the convex sections to be hydrophilic, so that when the magnetic particles are filled into the concave sections, the magnetic particles are surrounded by a dispersion stabilizing agent, and the hydrophobic groups of the dispersion stabilizing agent are facing the outside; and that the method comprises forming a layer made of carbon on at least the uppermost part of the intermediate layer, forming a resist pattern on the carbon layer, forming concave sections on the upper surface of the intermediate layer by etching the carbon layer, and then forming convex sections on the upper surface of the intermediate layer by partially removing the resist pattern; that the average particle size of the magnetic particles is in a 2-15 nm range; that the surfaces of the magnetic particles are surface-treated so that the minute particles attract each other in a self-assembling way; that the magnetic particles are FePt nano-particles; and that the intermediate layer is formed of one or more layers of a non-magnetic material.

According to the present invention, a new discrete track medium having a high magnetic recording density and manufacturing method therefor are implemented. According to the present invention, the magnetic recording density in the radial direction of the disk-shaped magnetic recording medium can be improved. The magnetic recording density in the circumferential direction (or rotation direction or bit direction of the disk) can also be improved. It is also possible to omit or decrease the burden of the polishing step.

DESCRIPTION OF THE PREFERRED EMBODIMENTS

Embodiments of the present invention will now be described with reference to drawings, examples, etc. These drawings, examples, etc. as well as the explanations are for describing the present invention, and shall not restrict the scope of the present invention. Needless to say, other embodiments are within the scope of the present invention as along as they conform to the essential character of the present invention. The same elements in the drawings may be denoted with the same reference symbols.

The magnetic recording medium according to the present invention is a so-called "discrete track medium". This is a disk-shaped magnetic recording medium having a soft magnetic layer, a magnetic recording layer thereover, and an intermediate layer directly under the magnetic recording layer, wherein the magnetic recording layer has a plurality of magnetic recording tracks arranged in the radial direction of the magnetic recording medium, and each magnetic recording track is separated from the other in the radial direction of the disk by concave sections and convex sections alternately formed on the upper surface of the intermediate layer in the radial direction of the disk. In other words, the magnetic recording layer is structurally separated by the convex sections, which is part of the intermediate layer. In this way, the magnetic recording density in the radial direction of the disk-shaped magnetic recording medium can be improved.

FIGS. 1-5 show this status compared with prior art. The arrow X in FIGS. 1-3 corresponds to the arrow B direction (radial direction) in FIG. 4, and arrow Y in FIGS. 1-3 corresponds to the arrow A direction (circumferential direction) in FIG. 4.

Figure 1:
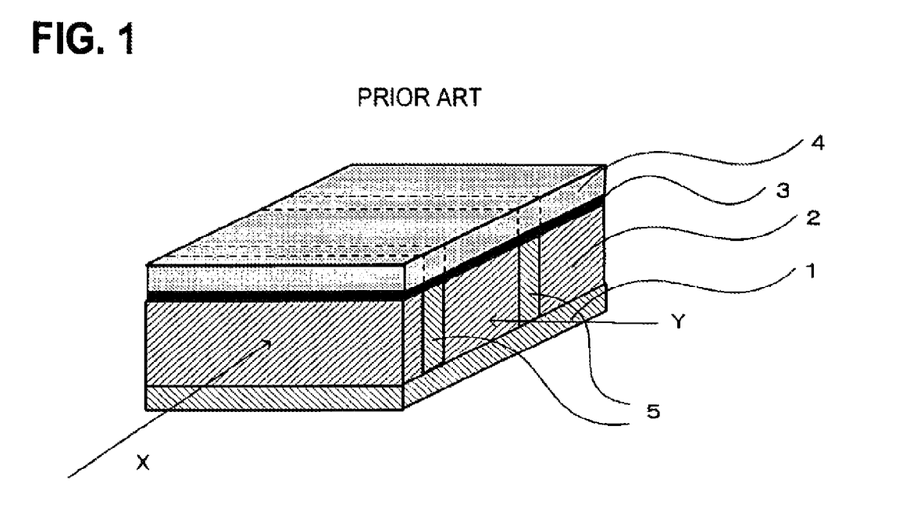
FIG. 1 is a schematic perspective view depicting a part of a discrete track medium where the soft magnetic layer is structurally separated by non-magnetic portions.

FIG. 1 is a perspective view depicting a part of a discrete track medium, where the soft magnetic layer 2 on the substrate 1 is structurally separated by non-magnetic portions 5. Because of these non-magnetic portions 5, the boundary portions 7 of the magnetic recording tracks 6, on the magnetic recording medium 1 in FIG. 4 (plan view of the disk-shaped magnetic recording medium), are formed on the magnetic recording layer 4 on the intermediate layer 3 in a circular form in the circumferential direction (arrow A direction) of the disk. As a result, a plurality of magnetic recording tracks 6 are formed in the radial direction.

Figure 2:
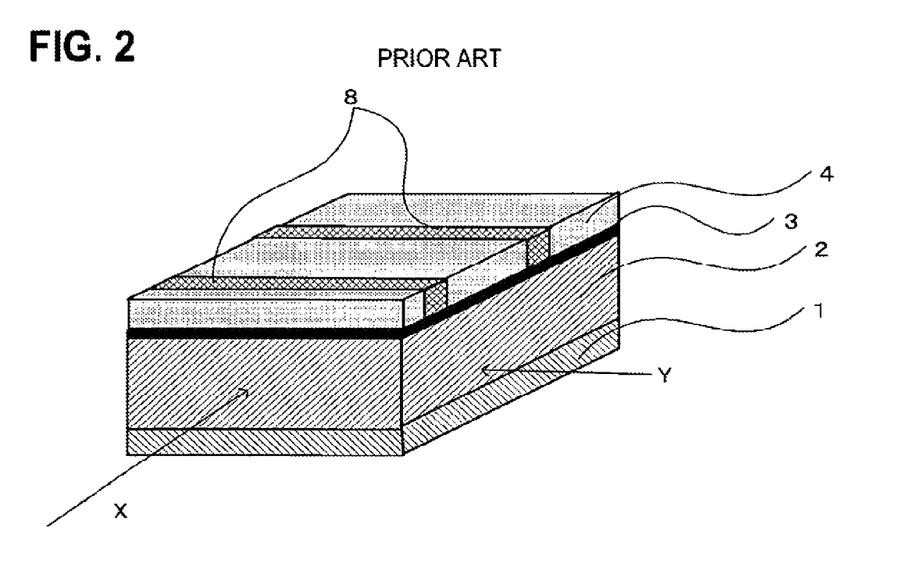
FIG. 2 is a schematic perspective view depicting a part of a discrete track medium where the magnetic recording layer is structurally separated by non-magnetic portions.
Figure 4:
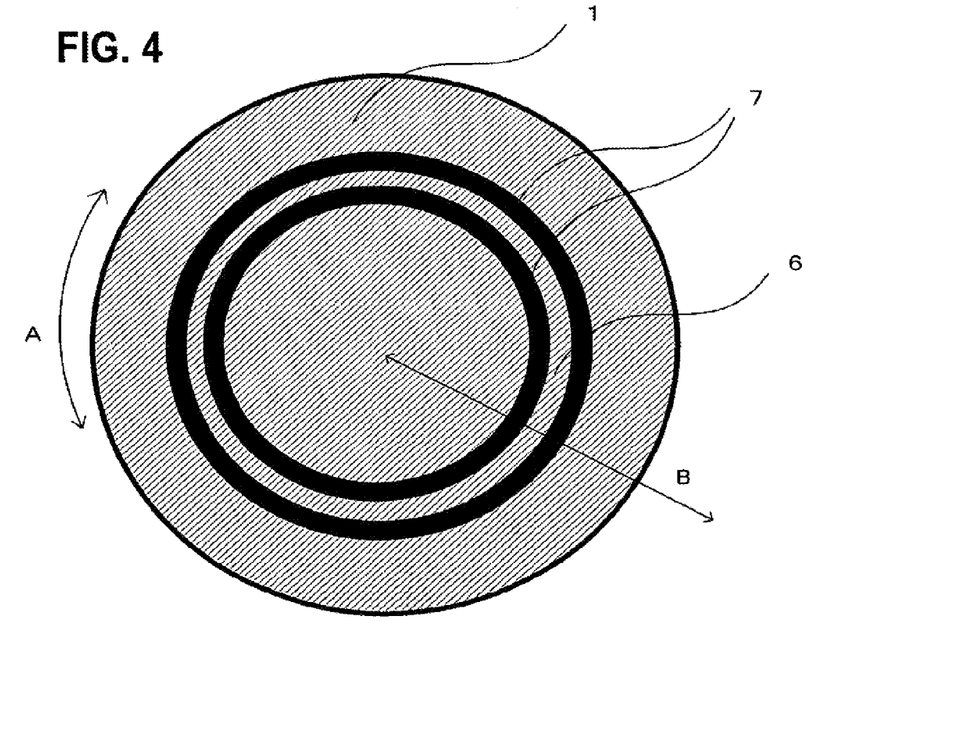
FIG. 4 is a (schematic) plan view depicting a disk-shaped magnetic recording medium.

FIG. 2 is a perspective view depicting a part of the discrete track medium, where the magnetic recording layer 4 on the intermediate layer 3 is structurally separated by the non-magnetic portions 8. In this case, because of the non-magnetic portions 8, the boundary portions 7 of the magnetic recording tracks 6 on the magnetic recording medium 1 in FIG. 4 are formed on the magnetic recording layer 4 in the circumferential direction of the disk. As a result, a plurality of magnetic recording tracks 6 are formed in the radial direction.

Figure 3:
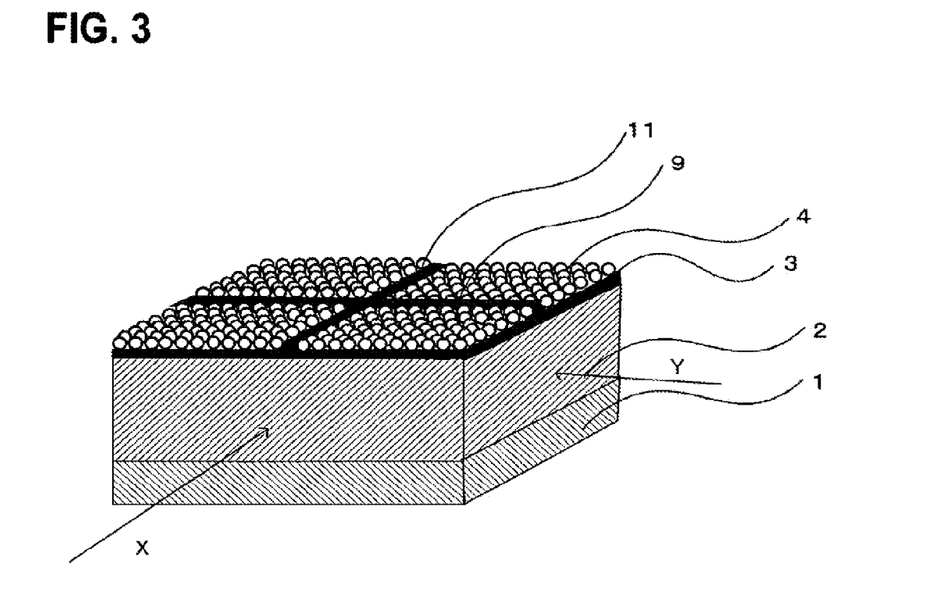
FIG. 3 is a schematic perspective view depicting a part of a discrete track medium according to the present invention.

FIG. 3, on the other hand, is a perspective view depicting a part of a discrete track medium, where the magnetic recording layer 4 is structurally separated by the convex portions 9, which are part of the intermediate layer 3 according to the present invention. Because of the convex portions 9, in the magnetic recording layer 4, the boundary portions 7 of the magnetic recording tracks 6 on the magnetic recording medium 1 in FIG. 4 are formed in a circular form in the circumferential direction of the disk. As a result, a plurality of magnetic recording tracks 6 are formed in the radial direction. In FIG. 4, only one magnetic recording track 6 and two boundary portions 7 are shown.

Figure 5:
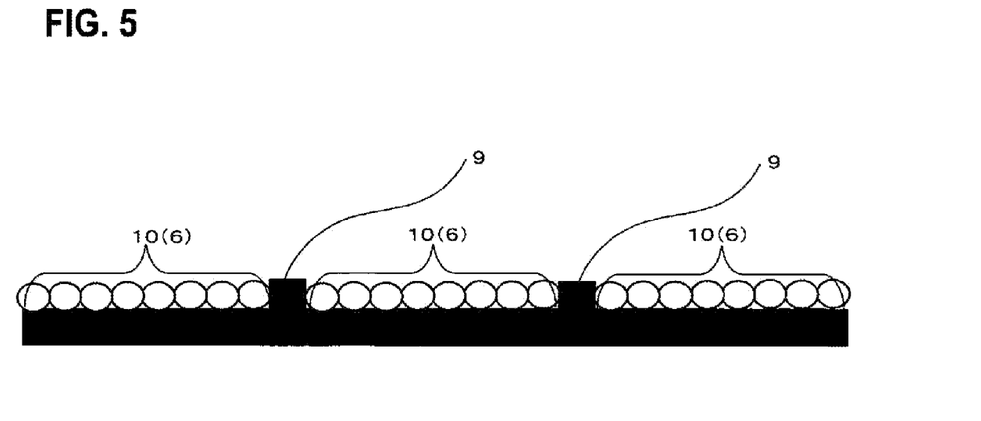
FIG. 5 is a cross-sectional view of the part in FIG. 3 viewed from the Y direction.

FIG. 5 is a cross-sectional view of the part in FIG. 3 in the arrow Y direction. As FIG. 5 shows, the upper surface of the intermediate layer 3 according to the present invention is composed of the alternately formed convex sections 9 and concave sections 10, and each magnetic recording track 6 is separate from the other by the convex sections 9 in the radial direction of this disk. In FIGS. 3 and 5, magnetic particles are shown in a one-particle layer, but the present invention is not limited to this, and the magnetic recording layer 4 may also be composed of a plurality of layers of magnetic particles.

FIG. 3 also shows a convex section 11 which is perpendicular to a convex section 9. Since the convex sections of the present invention can easily be created in a desired direction, the boundary portions (not illustrated in FIG. 4) separating the magnetic recording tracks can be formed in the circumferential direction of the disk (arrow A direction), as in the case of the convex section 11. If there are too many boundary portions like this, portions are increased where magnetic particles are not present, causing decrease of the magnetic recording density in the circumferential direction of the disk drops. However, when the magnetic material is arrayed with some regularity in the magnetic recording layer, and the array is disturbed, an appropriate number of boundary portions can be created to prevent the propagation of this disturbance, whereby the magnetic recording density in the circumferential direction of the disk can be improved as a whole. This could be advantageous.

The magnetic recording medium according to the present invention may include layers other than the above, if necessary. For example, an adhesion layer made of Ti may be formed between the soft magnetic layer and the substrate. Also, on the magnetic recording layer, a protective film and a lubricant layer are normally formed. In the present invention, there is no particular limitation to the materials for the substrate, soft magnetic layer and other optional layers, and they can be appropriately selected from known materials.

The intermediate layer according to the present invention is a layer made of a non-magnetic material, and is directly under the magnetic recording layer. This is normally formed to suppress the magnetic interaction caused by direct contact of the soft magnetic layer and the magnetic recording layer, but may have another purpose, or may be formed only to create the protrusions/recesses of the present invention. The material for the intermediate layer can be appropriately selected from any non-magnetic materials conforming to this purpose, but it is preferable to be compatible with the material to be used for the magnetic recording layer. For example, if the material to be used for the magnetic recording layer is hydrophobic, then a material which is not hydrophilic, or a material which is hydrophobic is preferable.

The intermediate layer according to the present invention is directly under the magnetic recording layer. However not all of the intermediate layer is directly under the magnetic recording layer, but as the relationship between the convex sections 9 and the magnetic recording tracks 6 in FIG. 5 shows, the convex sections of the intermediate layer form the same plane as the magnetic recording layer.

The intermediate layer according to the present invention may be composed of one layer. They may also be composed of two or more layers of non-magnetic material. In such a case, the protrusions/recesses may be formed only on the uppermost layer. The uppermost layer may be composed only of convex sections.

Examples of specific materials for the intermediate layer are ruthenium (Ru), carbon, platinum (Pt), rhodium (Rh), etc. Carbon is particularly preferable for at least the section for forming protrusions/recesses, since it is highly compatible, in many cases, with materials to be used for the magnetic recording layer, and protrusions/recesses can be processed easily.

The height difference between the concave sections and the convex sections (that is, the depth of the concave sections) and their width can be determined according to purposes. To use the later-described nano-magnetic particles for the magnetic material of the magnetic recording layer, the height difference of the concave sections and the convex sections in the range equivalent to the thickness of 1-20 particle layers is often preferable.

The magnetic particles to be used for the magnetic recording layer according to the present invention are not specifically limited, and can be appropriately selected from known hard magnetic minute particles. The average particle size (diameter) thereof is preferable in a 2-15 nm range, since the particles must be filled in the concave sections.

The average particle size can be measured by an x-ray diffraction method, by means of transmission electron microscope or the like.

From the viewpoints of being filled regularly in the concave sections and therefore being able to be expected to have a high magnetic recording density, it is preferable that the surfaces of the magnetic particles are surface-treated so that the minute particles attract each other in a self-assembling way. Here, "minute particles attract each other in a self-assembling way" means that when minute particles or materials containing minute particles (e.g. minute particles surrounded by a dispersion agent) are deposited on the intermediate layer by some method, the minute particles attract each other and will line up with some regularity, just like a self-assembling film. It is unnecessary to confirm that the minute particles attract each other, and it can be considered as the requirement of "minute particles attract each other in a self-assembling way" according to the present invention being satisfied, if the minute particles are arranged with some regularity when the minute particles or materials containing the minute particles are deposited on the intermediate layer by some method. For such magnetic minute particles, FePt nano-particles are preferable.

The magnetic recording medium having the above structure can be manufactured by a method for manufacturing a disk-shaped magnetic recording medium having a soft magnetic layer, magnetic recording layer thereover, and intermediate layer directly under the magnetic recording layer, wherein concave sections and convex sections are alternately formed on the upper surface of the intermediate layer in the radial direction of this disk, and magnetic particles are filled into the concave sections in a self-assembling way. By this manufacturing method, the magnetic recording density of the disk-shaped magnetic recording medium in the radial direction can be improved. It is also possible to omit the polishing step or decrease the burden thereof. By forming concave sections and convex sections on the upper surface of the intermediate layer in the circumferential direction of the disk, the magnetic recording density in the circumferential direction can be improved.

Requirements for the soft magnetic layer, magnetic recording layer, intermediate layer and other layers as well as materials for forming these layers used in the present invention, and preferred embodiments are the same as those requirements for the above described magnetic recording medium and preferable embodiments.

Methods of fabricating the soft magnetic layer, magnetic recording layer and intermediate layer are not specifically restricted either, and can be appropriately selected from known methods. Examples are a sputtering method, electroplating method, etc. for the soft magnetic layer; a sputtering method, vacuum deposition method and method for coating a slurry containing minute particles followed by forming a layer using the properties of the minute particles which attract each other in a self-assembling way, for the magnetic recording layer; and a sputtering method using carbon, ruthenium and platinum, a deposition method, etc. for the intermediate layer.

The method for fabricating the protrusions/recesses according to the present invention is not specifically restricted, and can be appropriately selected from known methods. Dry etching, wet etching and a press method using a mold are examples.

In the present method, it is preferable to treat the upper surfaces of the convex sections to be hydrophilic or hydrophobic so as to repel the magnetic particles to be used. By this, the upper surfaces of the convex sections and the magnetic particles are repelled from each other, so it is easy to fill the magnetic particles selectively into the concave sections merely by placing the magnetic particles on the intermediate layer. The method to treat the surface to be hydrophilic or hydrophobic is not specifically restricted. An example is a method in which a hydrophilic or hydrophobic material film is formed by application or the like of the material on the upper surfaces of the convex sections.

Figure 6:
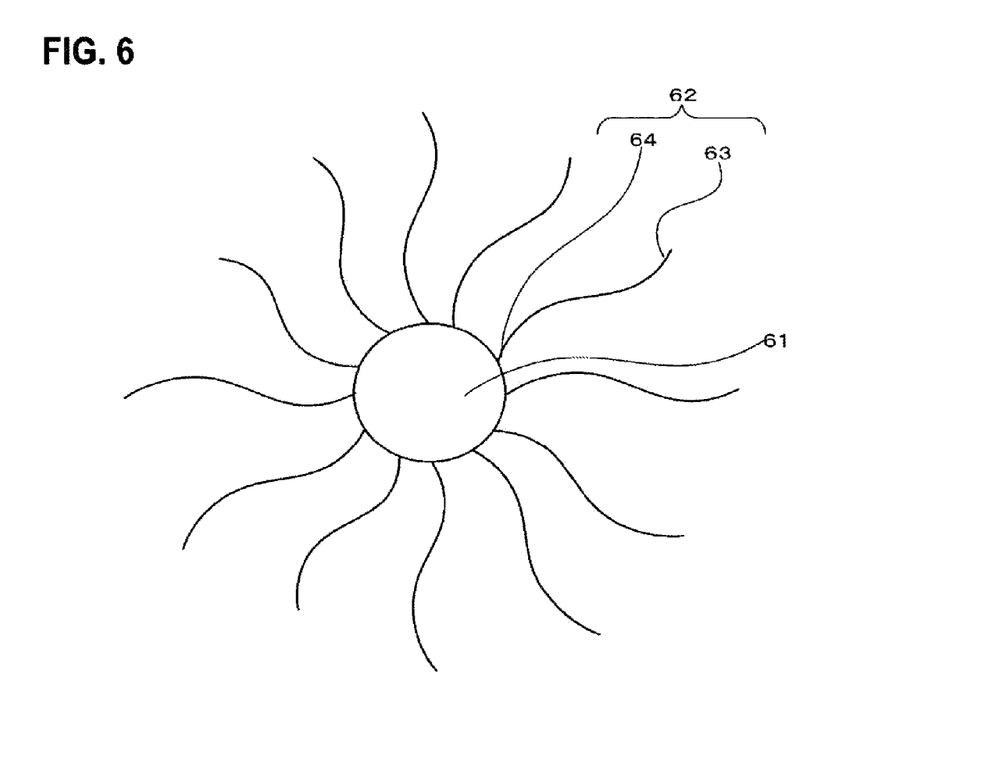
FIG. 6 is a schematic diagram depicting a dispersion stabilizing agent surrounding a magnetic particle.

More specifically, it is preferable that the upper surfaces of the convex sections are treated to be hydrophilic, and when the magnetic particles are filled into the concave sections, the magnetic particles are surrounded by a dispersion stabilizing agent, and the hydrophobic groups of the dispersion stabilizing agent are facing the outside. The status that hydrophobic groups of a dispersion stabilizing agent are facing the outside means a state where hydrophobic groups 63 are present on the outside of dispersion stabilizing agents 62 around magnetic particles 61, as shown in FIG. 6. Normally hydrophilic groups 64 are present on the inside of the dispersion stabilizing agent 62. In this status, the hydrophobic groups 63 repel the hydrophilic upper surfaces of the convex sections, so the magnetic particles can be easily filled into the concave sections selectively.

A specific manufacturing method according to the present invention is a method for forming a carbon layer at least on the uppermost part of the intermediate layer, forming a resist pattern on the carbon layer, forming concave sections on the upper surface of the intermediate layer by etching the carbon layer, then forming convex sections on the upper surface of the intermediate layer by partially removing the resist pattern.

In the case of a carbon layer, protrusions/recesses can be easily formed by etching, such as plasma etching. If the resist pattern is partially removed, it is possible to make the magnetic particles placed on the intermediate layer repel the upper surfaces of the convex sections, utilizing hydrophilic or hydrophobic properties of the remaining portions of the resist pattern.

Partially removing the resist pattern means removing the resist pattern so that the film thickness of the resist pattern becomes thinner, but it is unnecessary to confirm how the resist pattern is removed. It is sufficient to confirm whether magnetic particles can be selectively filled into the concave sections easily, merely by placing the magnetic particles on the intermediate layer. A partial removal can be implemented by selecting an appropriate processing time using a conventional resist pattern removal technology.

FIGS. 7-10 show an example of the manufacturing procedures of a magnetic recording medium according to the present invention. First, according to step 1, a soft magnetic layer 2, Ru layer 71 and carbon layer 72 are sequentially formed on a substrate 1. The carbon layer 72 corresponds to the intermediate layer 3 according to the present invention. It may be considered that the Ru layer 71 in combination with the carbon layer 72 corresponds to the intermediate layer 3 according to the present invention.

Figure 7:
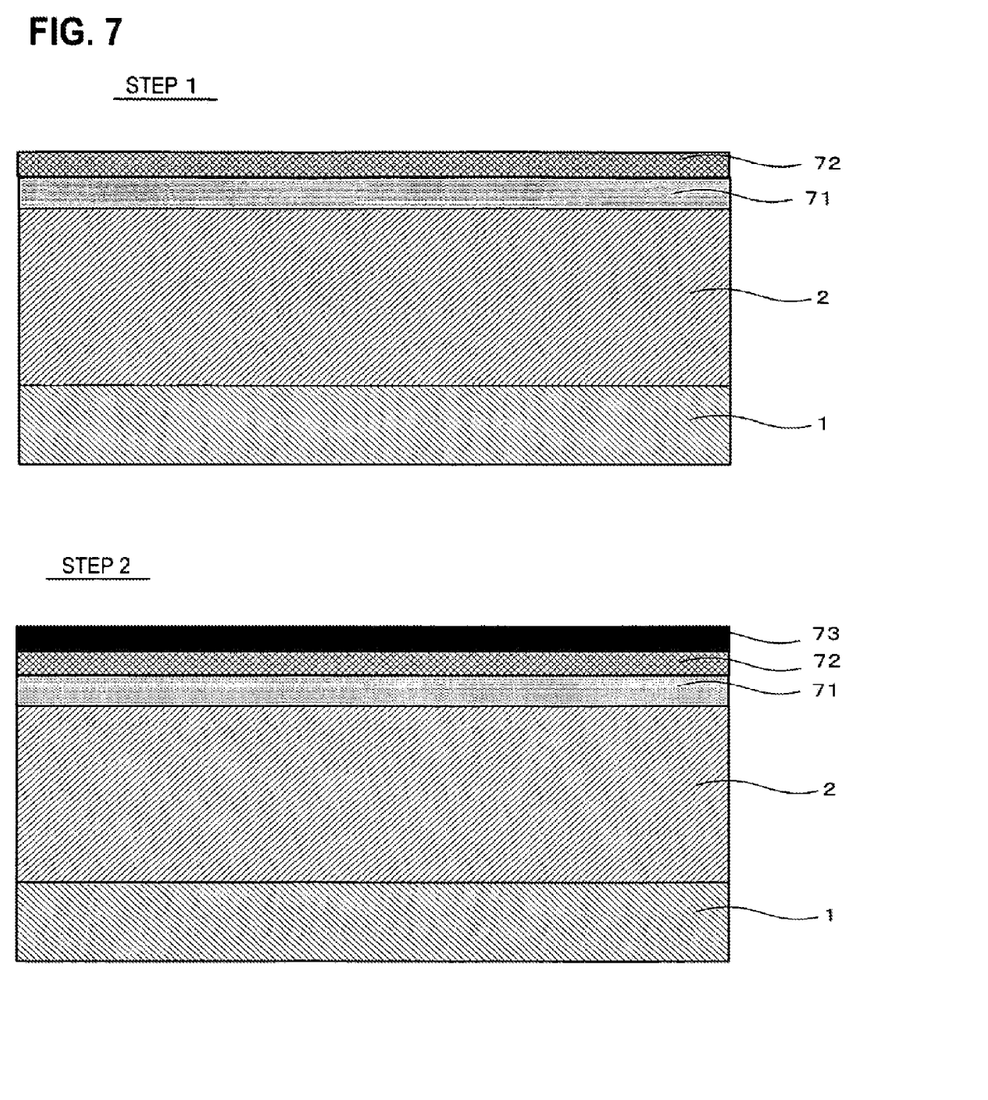
FIG. 7 shows schematic cross-sectional views of a magnetic recording medium illustrating an example of a manufacturing procedure of a magnetic recording medium according to the present invention.

Then, according to step 2, a resist layer 73 is formed on the carbon layer 72. If a self-assembling type mono-molecular resist layer is formed (e.g. Takayuki Honma, "Functional Nanostructure Thin Film Formation by Wet Process", Japanese Applied Magnetics Society Magazine, 2005, Vol. 29, No. 12, pp. 1035-1040), a very thin layer can be formed.

Figure 8:
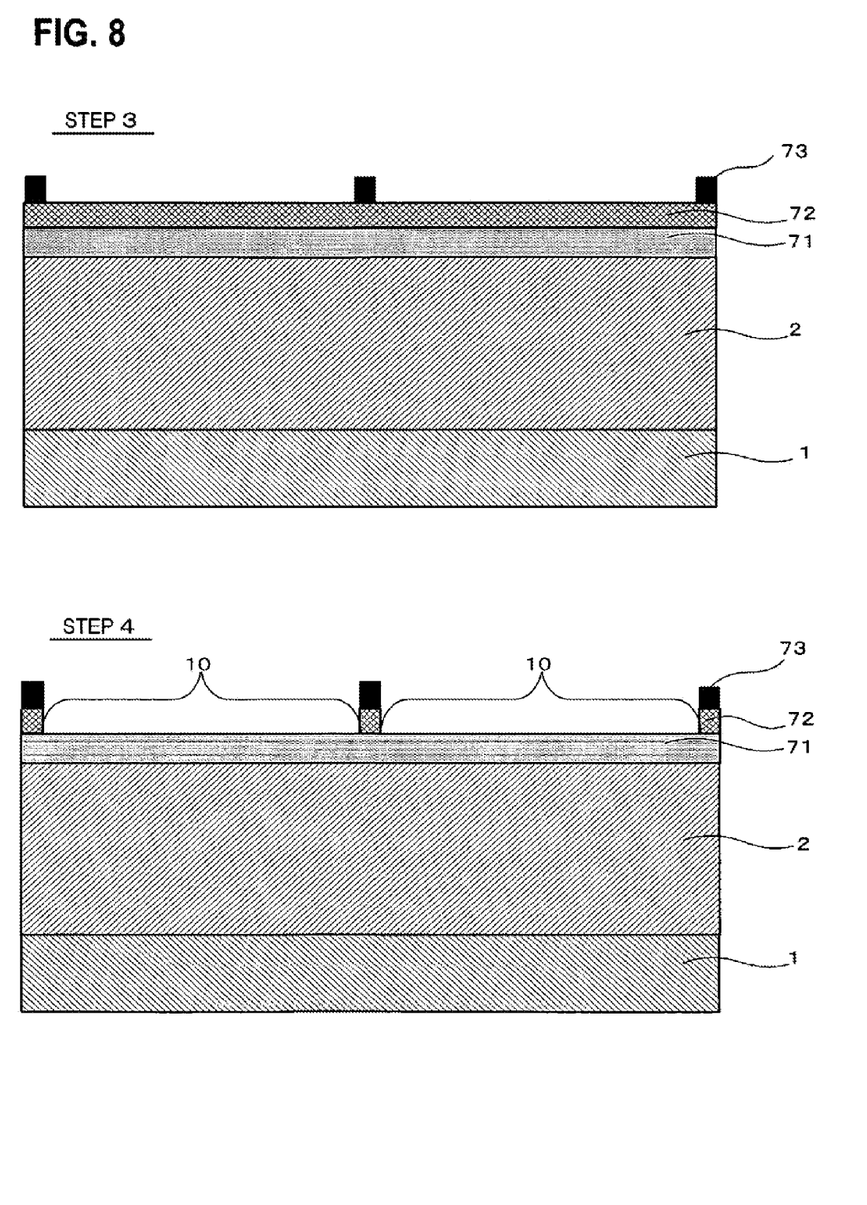
FIG. 8 shows schematic cross-sectional views of a magnetic recording medium depicting an example of a manufacturing procedure of a magnetic recording medium according to the present invention.
Figure 9:
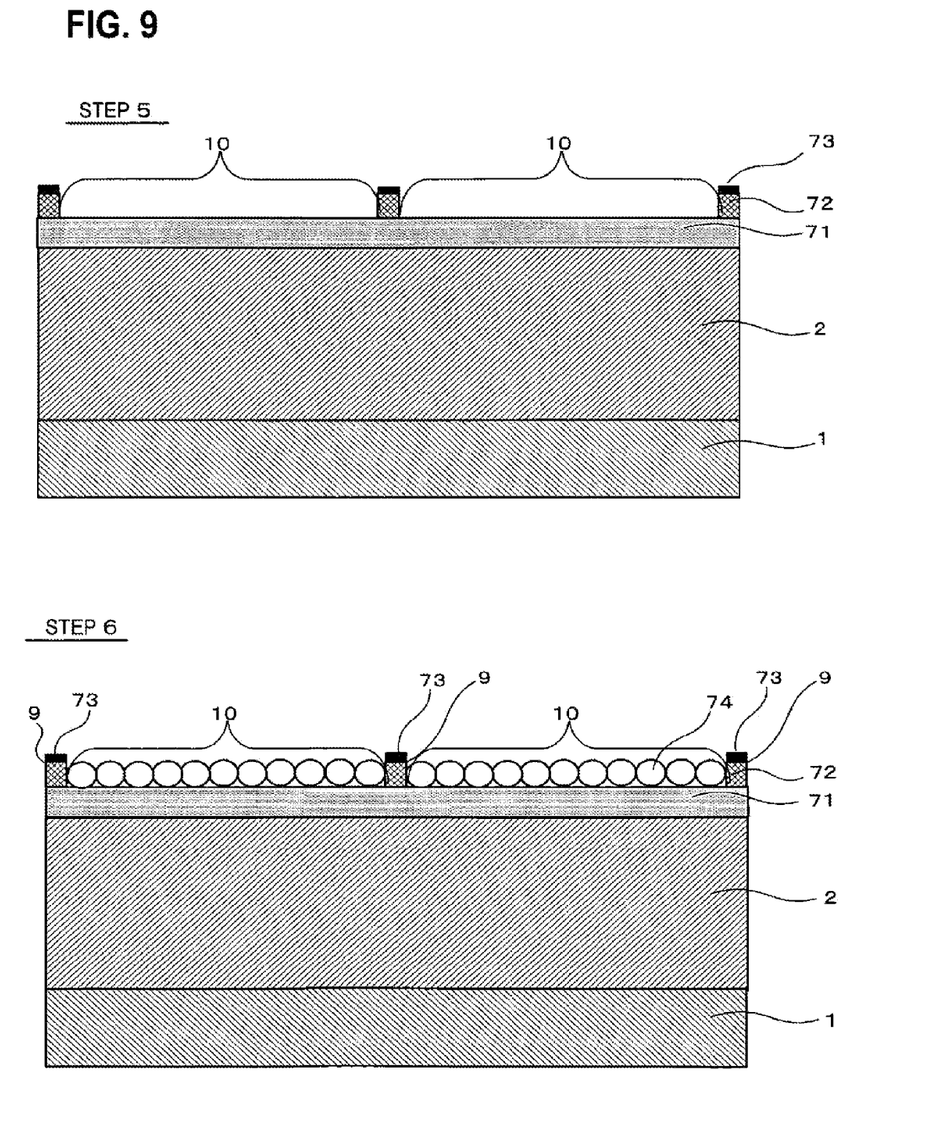
FIG. 9 shows schematic cross-sectional views of a magnetic recording medium depicting an example of a manufacturing procedure of a magnetic recording medium according to the present invention.
Figure 10:
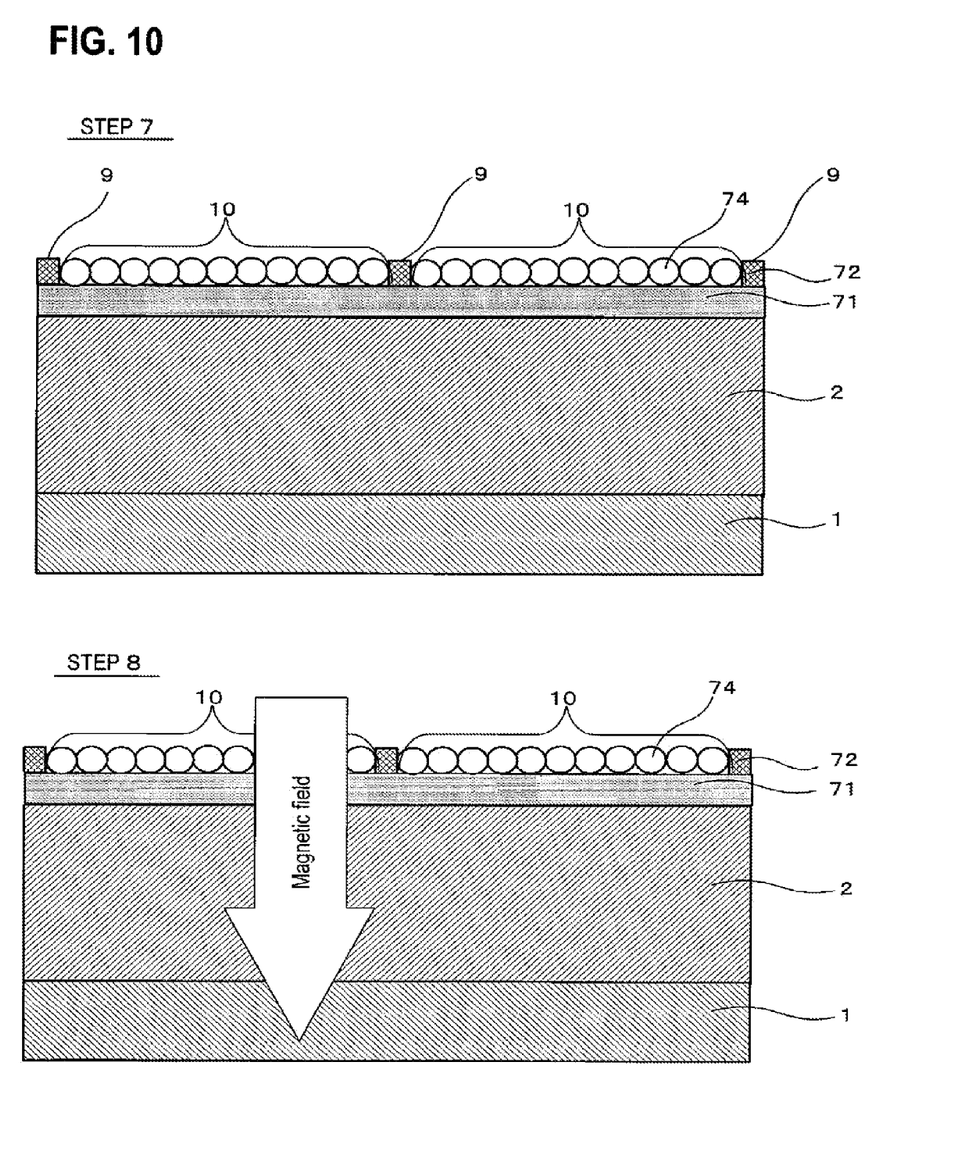
FIG. 10 shows schematic cross-sectional views of a magnetic recording medium depicting an example of a manufacturing procedure of a magnetic recording medium according to the present invention.

Then, according to step 3, magnetic recording track forms are patterned in the resist layer 73, then according to step 4, the carbon layer 72 is etched by reactive ion etching (RIE), for example, to form concave sections 10. Then, according to step 5, the resist layer 73 is processed so that the resist layer 73 slightly remains. This can be implemented by adjusting the processing time of alkali processing, for example.

Then, according to step 6, the magnetic particles (e.g. FePt nano-particles) 74 are placed on the carbon layer 72, then the magnetic particles are deposited only in the concave sections 10, since the slightly remaining resist layer 73 on the surfaces of the convex sections 9 and 11 repels the magnetic particles. Then, according to step 7, the remaining resist layer 73 is removed. And then according to step 8, annealing is performed in the magnetic field, and the magnetic recording medium, where the magnetic recording tracks 6 are separated by the convex sections 9 and 11, as shown in FIG. 3 and FIG. 5, can be acquired.

EXAMPLES

Now an example of the present invention will be described in detail.

Example 1

Structure with a Two-Tier Intermediate Layer

First, the synthesis of nano-particles to be used as the magnetic recording layer material will be described. Nano-particles can be synthesized by a super hydride method, a polyol method disclosed in Sun et al, "Journal of Applied Physics", 1999, Vol. 85, pp. 4325, and also disclosed in "Science", 2000, Vol. 287, pp. 1989-1992, or Japanese Unexamined Patent Application Publication No. 2000-54012 (Claims), etc. In these methods, various alloys can be synthesized by selecting raw materials.

Then, a specific method for synthesizing FePt nano-particles will be described. Under an argon atmosphere, 20 mL of dioctyl ether was added to a flask containing 197 mg (0.5 mmol) of platinum bisacetylacetonate and 390 mg of 1, 2-hexadecanediol, and 0.32 mL (1.0 mmol) of oleic acid and 0.34 mL (1.0 mmol) of oleyl amine were also added, then 0.13 mL (1.0 mmol) of Fe $(CO)_5$ was added, and the mixture was reacted at 230° C. while mixing.

After thirty minutes of reaction, the solution was cooled down to room temperature, 40 mL of ethanol was added, and centrifugation was performed, and the sediment was dispersed in hexane to form a liquid in which FePt nano-particles were dispersed. The average particle size of the FePt nano-particles acquired under these conditions was 4.3 nm. This average particle size was measured by a transmission electron microscope. The composition ratio of FePt was 50 atomic % of Fe and 50 atomic % of Pt. By changing the mixing ratio of raw materials, Fe rich or Pt rich nano-particles can be created. The nano-particles created by this method are in the status where the hydrophobic groups of the dispersion stabilizing agent (oleic acid, oleyl amine) are facing the outside.

Now steps for manufacturing a magnetic recording medium of the present invention will be described. In the present example, an Si substrate with a thermally oxidized film having an outer diameter of 65 mm and an inner diameter 20 mm was used.

First, 3 nm of a Ti film was deposited on the Si substrate by a sputtering method. This layer has a role to improve the adhesion between the substrate and the layer to be formed above it. Therefore materials other than Ti can be used only if they furnish adhesiveness.

Then, 100 nm of an FeSi film, which is a soft magnetic material, was deposited by a sputtering method. Then, 3 nm of an Ru film was deposited. Then, 12 nm of a carbon film was deposited by a sputtering method. This Ru film together with a carbon film form an intermediate layer according to the present invention. In other words, this carbon film corresponds to a "carbon layer formed at least on the uppermost part of the intermediate layer".

Here, protrusions/recesses were formed on the carbon film by a lithography process. First, a hydrophilic resist was formed on the carbon film by a spin coat method. After exposure, unnecessary part of the resist was removed with an organic solvent. By the processes thus far, a pattern was formed which comprised the hydrophilic resist surface and carbon film surface where the resist was not present and carbon was exposed. Then, the carbon film portion where carbon was exposed was removed by plasma etching. By this, the "concave sections on the upper surface of the intermediate layer" were formed.

Then, the resist was removed. At this time, the resist was removed such that a 1 nm or less thickness of the resist remained. By this, the "convex sections on the upper surface of the intermediate layer" according to the present invention were formed. The resist that slightly remained on the upper surfaces of the convex sections had hydrophilic properties. Since there was no resist remained in areas other than the upper surfaces of the convex sections, only the upper surfaces of the convex sections can have hydrophilic properties.

In this way, doughnut-shaped concave sections and convex sections, alternately arranged in the radial direction of the disk, were fabricated. The width of a convex section was 10 nm, the width of a concave section was 30 nm, and the height difference between the convex sections and the concave sections was 16 nm.

Then, nano-particles of FePt were deposited in the concave sections using a spin coater. At this time, the conditions of the spin coat method were optimized so that the height of the convex sections was made to match the height of the portions where the nano-particles were filled. The upper surfaces of the convex sections were treated to be hydrophilic, so the adhesion of nano-particles was weak there, and it was possible to fill the nano-particles only into the concave sections by optimizing the conditions of the spin coat method. Then, using an asher, the slightly remaining resist was completely removed.

Then, heat treatment was performed at 500° C. for 30 minutes in vacuum while an external magnetic field was vertically applied to the substrate. By this, an axis of easy magnetization of the nano-particles was aligned in the vertical direction which was the external magnetic field applying direction, to furnish vertical alignment properties.

Then, in order to implement a protective film function to the magnetic recording medium, a 4 nm film of carbon was deposited by a sputtering method, and a film of lubricant was formed by a dip method.

By the processes described above, a magnetic recording medium could be manufactured where magnetic recording tracks separated from each other were formed on the intermediate layer. The track pitch of the discrete track medium of the present invention was 40 nm, resulting in 635 kTPI (Truck Per Inch), so a track density of 10 times or more as high as that of the current medium was implemented.

What is claimed is:

1. A method for manufacturing a magnetic recording medium in a shape of a disk comprising a soft magnetic layer, and an intermediate layer and a magnetic recording layer formed by magnetic particles in this order on said soft magnetic layer, the method comprising:
    forming convex sections repeating on the upper surface of said intermediate layer in the radial direction of said disk, and each having an upper surface that repulses said magnetic particles; and
    filling magnetic particles into concave sections sandwiched by the convex sections in a self-assembling way to form said magnetic recording layer with said magnetic particles,
    wherein the surfaces of the magnetic particles are surface-treated so that the minute particles attract each other in a self-assembling way.

2. The method for manufacturing a magnetic recording medium according to claim 1, further comprising forming concave sections and convex sections on the upper surface of said intermediate layer in the circumferential direction of said disk.

3. The method for manufacturing a magnetic recording medium according to claim 1, further comprising treating the upper surfaces of the convex sections to be hydrophilic or hydrophobic so as to repel the magnetic particles.

4. The method for manufacturing a magnetic recording medium according to claim 3, wherein
    the upper surfaces of said convex sections are treated to be hydrophilic, and
    when said magnetic particles are filled into said concave sections, said magnetic particles are surrounded by a dispersion stabilizing agent, and hydrophobic groups of the dispersion stabilizing agent are facing the outside.

5. The method for manufacturing a magnetic recording medium according to claim 1, further comprising:
    forming a layer made of carbon on at least the uppermost part of the intermediate layer;
    forming a resist pattern on said carbon layer;
    forming concave sections on the upper surface of said intermediate layer by etching said carbon layer; and
    then, forming convex sections on the upper surface
    of said intermediate layer by partially removing said resist pattern.

6. The method for manufacturing a magnetic recording medium according to claim 1, wherein the average particle size of said magnetic particles is in a 2-15 nm range.

7. The method for manufacturing a magnetic recording medium according to claim 1, wherein said magnetic particles are FePt nano-particles.

8. The method for manufacturing a magnetic recording medium according to claim 1, wherein said intermediate layer is formed of one or more layers of non-magnetic material.

9. A method for manufacturing a magnetic recording medium in a shape of a disk comprising a soft magnetic layer, and an intermediate layer and a magnetic recording layer formed by magnetic particles in this order on said soft magnetic layer, the method comprising:

forming convex sections repeating on the upper surface of said intermediate layer in the radial direction of said disk, and each having an upper surface that repulses said magnetic particles; and filling magnetic particles into concave sections sandwiched by the convex sections in a self-assembling way to form said magnetic recording layer with said magnetic particles, the method further comprising treating the upper surfaces of the convex sections to be hydrophilic so as to repel the magnetic particles, wherein when said magnetic particles are filled into said concave sections, said magnetic particles are surrounded by a dispersion stabilizing agent, and hydrophobic groups of the dispersion stabilizing agent are facing the outside.

10. The method for manufacturing a magnetic recording medium according to claim 9, further comprising forming concave sections and convex sections on the upper surface of said intermediate layer in the circumferential direction of said disk.

11. The method for manufacturing a magnetic recording medium according to claim 9, wherein the average particle size of said magnetic particles is in a 2-15 nm range.

12. The method for manufacturing a magnetic recording medium according to claim 9, wherein said magnetic particles are FePt nano-particles.

13. The method for manufacturing a magnetic recording medium according to claim 9, wherein said intermediate layer is formed of one or more layers of non-magnetic material.

14. The method for manufacturing a magnetic recording medium according to claim 9, further comprising:

forming a layer made of carbon on at least the uppermost part of the intermediate layer;

forming a resist pattern on said carbon layer;

forming concave sections on the upper surface of said intermediate layer by etching said carbon layer; and then, forming convex sections on the upper surface of said intermediate layer by partially removing said resist pattern.

* * * * *